United States Patent
Dong et al.

(10) Patent No.: US 11,548,803 B2
(45) Date of Patent: Jan. 10, 2023

(54) METHOD FOR ENHANCING DEEP DEGRADATION OF PROTEINS IN SLUDGE

(71) Applicant: TONGJI UNIVERSITY, Shanghai (CN)

(72) Inventors: Bin Dong, Shanghai (CN); Sisi Chen, Shanghai (CN); Jun Gao, Shanghai (CN); Danni Shen, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 80 days.

(21) Appl. No.: 17/239,699

(22) Filed: Apr. 26, 2021

(65) Prior Publication Data
US 2021/0403359 A1 Dec. 30, 2021

(30) Foreign Application Priority Data
Jun. 27, 2020 (CN) .................. 202010595395.X

(51) Int. Cl.
*C02F 11/04* (2006.01)
*C02F 11/00* (2006.01)
(Continued)

(52) U.S. Cl.
CPC ............ *C02F 11/04* (2013.01); *C02F 11/006* (2013.01); *C02F 11/127* (2013.01);
(Continued)

(58) Field of Classification Search
CPC ............... C02F 11/04; C02F 11/006; C02F 2201/46105; C02F 2303/06; C02F 11/127; C02F 2101/30
(Continued)

(56) References Cited

FOREIGN PATENT DOCUMENTS

CN 102718381 10/2012
CN 105621826 A * 6/2016
(Continued)

OTHER PUBLICATIONS

Machine-generated English translation of WO 2011-156885, generated on Sep. 7, 2022.*
(Continued)

*Primary Examiner* — Fred Prince
(74) *Attorney, Agent, or Firm* — JCIP Global Inc.

(57) ABSTRACT

The present invention relates to a method for enhancing deep degradation of proteins in sludge. The method includes the following steps: an anaerobic digestion product of excess sludge as a substrate is treated by Van Soest's washing method to obtain the sludge free of easily degradable organics and containing degradation-resistant proteins; then, with the anaerobic digestion product of excess sludge as an inoculum and the sludge free of easily degradable organics and containing degradation-resistant proteins as a substrate, a first-stage microbial electrolytic cell coupled anaerobic digestion system is started for treatment to obtain a microbial mixture related to targeted degradation of the degradation-resistant proteins; with the microbial mixture related to targeted degradation of the degradation-resistant proteins as an inoculum and the anaerobic digestion product of excess sludge as a substrate, a second-stage microbial electrolytic cell coupled anaerobic digestion system is started to obtain the sludge with deeply degraded proteins.

10 Claims, 1 Drawing Sheet

(51) Int. Cl.
   *C02F 11/12* (2019.01)
   *C02F 11/127* (2019.01)
   *C02F 101/30* (2006.01)

(52) U.S. Cl.
   CPC .................... *C02F 2101/30* (2013.01); *C02F 2201/46105* (2013.01); *C02F 2303/06* (2013.01)

(58) Field of Classification Search
   USPC ................... 210/603, 748.01, 905, 908, 601
   See application file for complete search history.

(56) References Cited

FOREIGN PATENT DOCUMENTS

| | | | |
|---|---|---|---|
| CN | 105803001 | | 5/2019 |
| EP | 1553059 A1 | * | 7/2005 |
| JP | 2013-505130 A | * | 2/2013 |
| WO | WO 2011-156885 A1 | * | 12/2011 |

OTHER PUBLICATIONS

Machine-generated English translation of JP 2013-505130, generated on Sep. 7, 2022.*
Machine-generated English translation of CN 105621826, generated on Sep. 7, 2022.*
Machine-generated English translation of EP 1553059, generated on Sep. 7, 2022.*

* cited by examiner

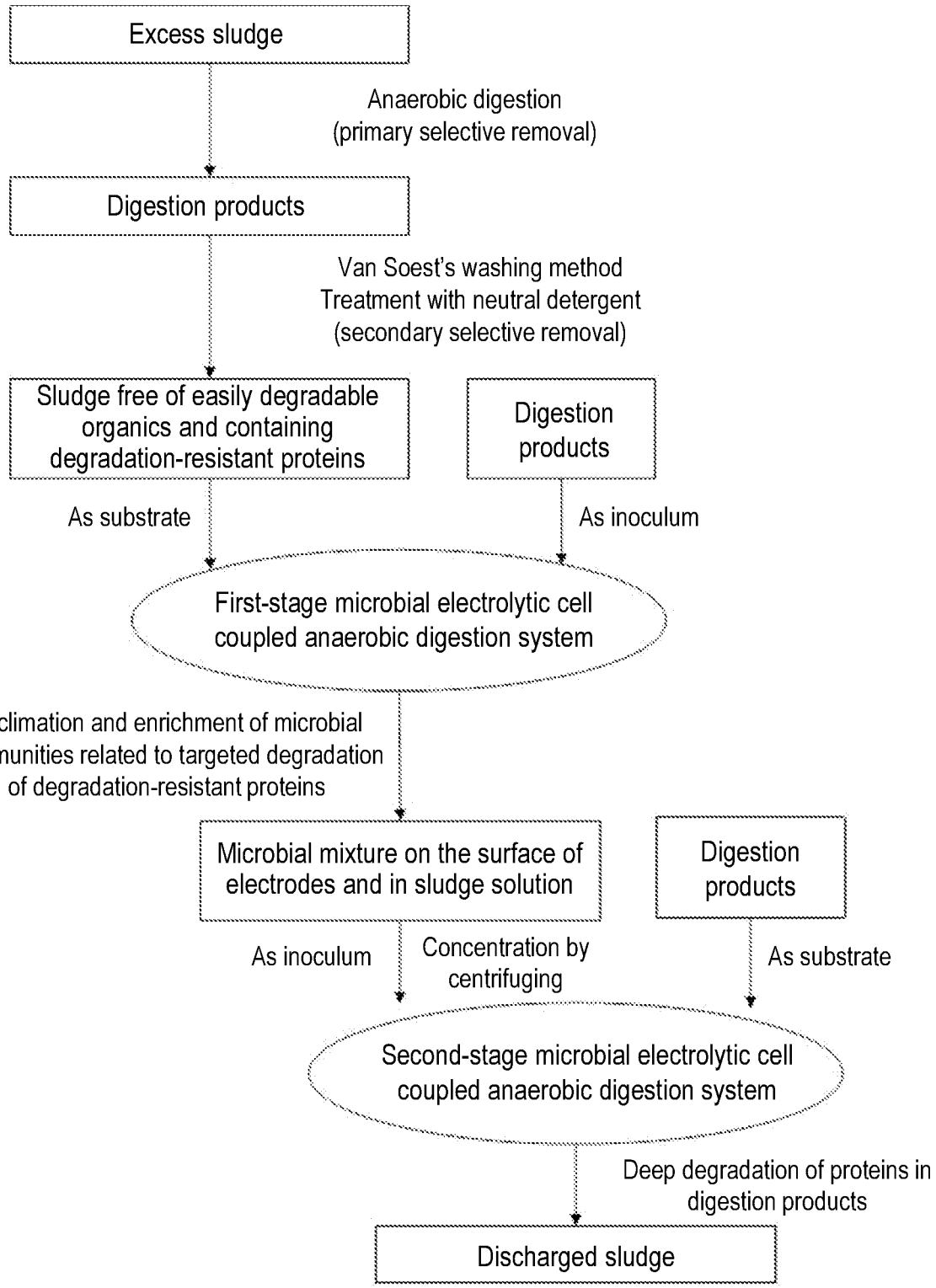

METHOD FOR ENHANCING DEEP DEGRADATION OF PROTEINS IN SLUDGE

CROSS-REFERENCE TO RELATED APPLICATION

This application claims the priority benefit of China application serial no. 202010595395.X, filed on Jun. 27, 2020. The entirety of the above-mentioned patent application is hereby incorporated by reference herein and made a part of this specification.

BACKGROUND

Technical Field

The present invention relates to a method for deeply degrading proteins in sludge, in particular to a method for enhancing deep degradation of proteins in sludge by using a microbial electrolytic cell coupled anaerobic digestion system, and belongs to the technical field of sludge anaerobic digestion.

Description of Related Art

Protein is the most important organic component in sludge (accounting for 50-60% by mass of volatile solids) and the most important substrate for biogas production by anaerobic digestion (contributing 60-70% to biogas yield). It is also the main hydrophilic substance in sludge, playing a more significant role in determining the conditioning and dehydration properties of sludge than polysaccharides and humus substances. Therefore, the improvement of anaerobic conversion efficiency of proteins in sludge plays a decisive role in the anaerobic methane production and stabilization, nitrogen cycling and subsequent conditioning and dehydration of sludge. However, the degradation rate of proteins in sludge in the anaerobic digestion system is generally lower than 50%, which makes the degradation rate of total volatile solids in the sludge be generally 40% or less, limiting the efficient and anaerobic methane production and stabilization of the sludge as well as the conditioning and dehydration properties of the digestion product. Therefore, it is necessary to enhance the anaerobic degradation of proteins in sludge.

At present, the strategies for enhanced anaerobic conversion of proteins in sludge mainly include acid-base pretreatment, ultrasonic pretreatment, biological pretreatment, ultraviolet pretreatment, and hydrothermal hydrolysis. However, despite the optimal application conditions, the final degradation rate of proteins after anaerobic digestion in pretreated sludge is basically below 60%, the degradation rate of total volatile solids in the sludge is generally 40-55%, and a large amount of residual non-degraded organics (accounting for 30-40% of the total solids) are still generally present in the digestion product, of which protein is still the main component (accounting for 40-50% by mass of the volatile solids). Therefore, further enhancing the degradation of the residual "stubborn" proteins in the digestion product by technical measures is of great significance for enhancing the deep degradation of proteins in the sludge, breaking through the bottleneck in the anaerobic conversion of the sludge, increasing the degradation rate of organics and methane yield, and improving the stability and dehydration properties of the digestion product.

The microbial electrolytic cell coupled anaerobic digestion system has multiple functions including anodic oxidation, regulating and acclimating functional microorganisms, enhancing enzyme activity and electron transfer, and the like, and can enhance the anaerobic degradation of organics (including non-degradable organics such as aromatic matters) and enhance the production of methane or hydrogen with low energy input. At present, however, the microbial electrolytic cell coupled anaerobic digestion system is generally applied to the anaerobic digestion system for the whole sludge mixture. For example, the Chinese patent document CN105803001B discloses a method for producing hydrogen from excess sludge by using the microbial electrolytic cell, where under the conditions of 10-15° C. with an applied external voltage of 0.5 V, with the excess sludge after ultrasonic pretreatment as a substrate, a single-chamber microbial electrolytic cell is operated to realize hydrogen production from the excess sludge; the Chinese patent document CN102718381A discloses a method for producing methane from excess sludge by using a microbial electrolytic cell, where the excess sludge is taken as a substrate for acclimation of anode functional microorganisms, a microbial electrolytic cell reactor is started to produce methane with the excess sludge as the substrate, wherein in the reaction process, the removal rate of proteins is 38-58%, and the removal rate of COD is 38-55%. In the above systems, due to the complexity of substrate components, the presence of a large amount of broad-spectrum organics such as degradable organics and intermediate metabolites VFAs makes the microbial communities in the systems have high diversity, and as these substances have strong electron competition capacity, the microbial electrolytic cell coupled anaerobic digestion system is difficult to enrich microbial populations and key enzymes related to targeted degradation of non-degradable organics (such as residual "stubborn" proteins in the digestion product), so that the residual proteins in the digestion product are difficult to further degrade.

Therefore, how to induce the selection and enrichment of microorganisms (such as dominant electricity-producing bacteria and methanogenic bacteria) related to targeted degradation of degradation-resistant proteins in the microbial cell coupled anaerobic digestion system and further degrade the degradation-resistant proteins in the digestion product is an urgent problem to be solved to enhance deep degradation of proteins in sludge, which is of great significance to break through the bottleneck of sludge anaerobic conversion, increase the degradation rate of organics and methane yield, and improve the stability and dehydration performance of the digestion product.

SUMMARY

An objective of the present invention is to overcome the defect of low degradation rate of organics in sludge in the prior art and provides a method for enhancing deep degradation of proteins in sludge, which can realize deep degradation of proteins in the sludge, improve the degradation rate of organics and methane production of the sludge and improve the stability and dehydration performance of the digestion product.

The objective of the present invention can be achieved by the following technical solution:

A method for enhancing deep degradation of proteins in sludge, which includes the following steps:

(S1) treating an anaerobic digestion product of excess sludge as a substrate using a neutral detergent of Van Soest's washing method, removing a resultant supernatant to obtain a residue, and washing the residue with distilled water to be at a neutral pH value (pH=about 7) to obtain a sludge free of degradable organics, the sludge containing degradation-resistant proteins;

(S2) with the anaerobic digestion product of excess sludge as an inoculum and the sludge free of easily degradable organics obtained in the step (S1) as a substrate, starting a first-stage microbial electrolytic cell coupled anaerobic digestion system (carbon-carbon/iron-carbon electrode) by applying an external voltage through a direct current power supply to acclimate and enrich a target microorganism, taking a microbial mixture on a surface of an electrode and in a sludge solution to concentrate by centrifuging to obtain a microbial mixture related to targeted degradation of the degradation-resistant proteins; and (S3) with the microbial mixture obtained in the step (S2) as an inoculum and an anaerobic digestion product of excess sludge as a substrate, starting a second-stage microbial electrolytic cell coupled anaerobic digestion system (carbon-carbon/iron-carbon electrode) by applying an external voltage through a direct current power supply to degrade proteins in the anaerobic digestion product of the excess sludge.

Further, in the excess sludge, a proportion by mass of volatile solids to total solids (VS/TS) is 40-60%, and proteins account for 50-60% by mass of total volatile solids; in the anaerobic digestion product of the excess sludge, the proportion by mass of volatile solids to total solids (VS/TS) is 30-40%, and proteins account for 40-50% by mass of total volatile solids; in the sludge free of easily degradable organics in the step (S1), the proportion by mass of volatile solids to total solids is 20-30%, and proteins account for 20-40% by mass of total volatile solids.

Among them, the anaerobic digestion product of the excess sludge is the product of the anaerobic digestion of the excess sludge under various process conditions, including but not limited to, different pretreatment conditions (acid-base pretreatment, ultrasonic pretreatment, biological pretreatment, ultraviolet pretreatment, thermal hydrolysis pretreatment, etc.), anaerobic digestion conditions (medium temperature 37° C., high temperature 55° C., two-phase anaerobic digestion, etc.).

The anaerobic digestion process of the excess sludge adopts common technical means in the art and does not belong to the technical key points to be protected by the present invention.

Further, in the step (S2), a mass ratio of volatile solids between the inoculum and the substrate is 1:2-1:5.

Further, in the step (S2), the first-stage microbial electrolytic cell coupled anaerobic digestion system is in an anaerobic state, a water content in the system is 95-98%, an applied external voltage is 0.2-1.0 V, an operating temperature is 20-30° C., and operating time is 2-4 d.

Further, in the step (S2), when a degradation rate of degradation-resistant proteins in the first-stage microbial electrolytic cell coupled anaerobic digestion system is 40% or more, the acclimation and enrichment of the target microorganism are completed.

Further, in the step (S2), the centrifugal concentration condition is performed under a condition of 800-1500 rpm for 5-10 min.

Further, in the step (S2), the water content is 90-95% and the proportion by mass of volatile solids to total solids (VS/TS) is 30-40% in the microbial mixture.

Further, in the step (S3), the mass ratio of volatile solids between the inoculum and the substrate is 1:1-4:1.

Further, in the step (S3), the second-stage microbial electrolytic cell coupled anaerobic digestion system is in an anaerobic state, the water content in the system is 95-98%, the applied external voltage is 0.2-1.0 V, the operating temperature is 20-30° C., and the operating time is 4-8 d.

Further, in the step (S3), in the sludge discharged from the second-stage microbial electrolytic cell coupled anaerobic digestion system, proteins account for 20-35% by mass of total volatile solids, the degradation rate of proteins is 70-80%, the proportion by mass of volatile solids to total solids in the discharged sludge is 25-35%, and the degradation rate of total volatile solids is 50-70%.

The working principle of the present invention is as follows:

According to the present invention, the excess sludge is first subjected to anaerobic digestion for primary selective removal of a large amount of degradable organics in the excess sludge; then, the residual degradable organics in the digestion product is subjected to secondary selective removal using a neutral detergent of Van Soest's washing method so as to effectively separate and obtain the sludge free of easily degradable organics and containing degradation-resistant proteins; next, the sludge free of easily degradable organics and containing degradation-resistant proteins is used to induce the selection, acclimation and enrichment of the microorganism related to targeted degradation of the degradation-resistant proteins in the first-stage microbial electrolytic cell coupled anaerobic digestion system, and finally the microorganism for targeted degradation is inoculated in the second-stage microbial electrolytic cell coupled anaerobic digestion system to enhance the degradation of the proteins in the substrate, that is, the digestion product of excess sludge in the system, so as to realize deep degradation of proteins in the excess sludge.

In the present invention, the excess sludge is subjected to anaerobic digestion for primary selective removal of a large amount of degradable organics in the excess sludge, the main purpose of which is to avoid the negative influence of a large amount of degradable organics in the excess sludge not undergoing anaerobic digestion on the separation effect of the subsequent secondary selective removal. The present invention controls the proportion by mass of volatile solids to total solids (VS/TS) in the product of anaerobic digestion of the excess sludge to be 30-40%, and the protein content to be 40-50% by mass of total volatile solids.

In the present invention, the residual degradable organics in the digestion product are subjected to secondary selective removal using the neutral detergent of Van Soest's washing method to obtain sludge free of easily degradable organics and containing degradation-resistant proteins, the main purpose of which is to avoid the competition for electrons by the residual degradable organics in the digested sludge, thereby avoiding the difficulty in acclimation and enrichment of the microorganism related to targeted degradation of the degradation-resistant proteins in the anaerobic digestion system. The digestion product obtained after the anaerobic digestion still contains some degradable organics such as volatile fatty acids, polysaccharides, and lipids, which can compete for electrons in the system, promote the growth of a plurality of microorganisms in the system, increase the microbial diversity and interfere with the selection and enrichment of the microorganism with specific functions. These degradable organics can be removed by treatment with the neutral detergent of Van Soest's washing method to obtain degradation-resistant proteins, thereby providing preconditions and conditions for the acclimation and enrichment of the microorganism related to targeted degradation of degradation-resistant proteins. The present invention controls the proportion by mass of volatile solids to total solids (VS/TS)

in the sludge obtained after secondary selective removal which is free of easily degradable organics and contains degradation-resistant proteins to be 20-30%, and the protein content to be 20-40% by mass of total volatile solids.

In the present invention, in the step S2, with an anaerobic digestion product of excess sludge as the inoculum, and the sludge obtained after the primary and secondary selective removals which is free of easily degradable organics and contains degradation-resistant proteins as the substrate, the first-stage microbial electrolytic cell coupled anaerobic digestion system is started for the purpose of inducing, acclimating and enriching microbial communities for targeted enhanced degradation, wherein the ratio of inoculum to substrate is crucial. If the ratio of inoculum to substrate is too high, the system will be excessively affected by the inoculum, which makes it difficult for the microorganism for targeted degradation of the substrate to occupy the dominant position and be enriched; if the ratio is too low, the anaerobic digestion system will start up too slowly or even fail due to the lack of corresponding inoculum. Overall, in order to achieve desirable induction and acclimation efficiency and reduce the influence of microbial competition in the inoculated sludge on acclimation, the amount of inoculum should be significantly less than the amount of substrate. The present invention controls the mass ratio of volatile solids between the inoculum and the substrate in the step S2 to be 1:2-1:5.

In the present invention, in the step S3, with the product obtained by concentrating the microbial mixture on the surface of the electrode and in the sludge solution in the step S2 as the inoculum, and the anaerobic digestion product of the excess sludge in the step S1 as the substrate, the second-stage microbial electrolytic cell coupled anaerobic digestion system is started for the purpose of enhancing deep degradation of proteins in the excess sludge digestion product and enhancing methane production, wherein the ratio of inoculum to substrate is crucial. In the step S2, the microbial mixture on the surface of the electrode and in the sludge solution contains the acclimated and enriched microbial communities with the function of targeted degradation of degradation-resistant proteins, and related biological enzymes, and when the microbial mixture is inoculated in the anaerobic digestion product, the risk of growth and function limitation caused by the change of environmental factors is faced. If the ratio of inoculum to substrate is too low, the microbial content from the inoculum will be too low, leading to a low tolerance and growth adaptability of the whole community in the new environment and eventually failed inoculation. If the ratio of inoculum to substrate is too high, the system will limit the acclimation and enrichment of the microorganism for targeted degradation in the new system because of the lack of corresponding substrates. Overall, in order to ensure the successful inoculation and acclimation of inoculum in the new system and reduce the risk of inoculation failure due to low tolerance and growth adaptability, the amount of the inoculum added should be significantly higher than the amount of the substrate. The present invention controls the mass ratio of volatile solids between the inoculum and the substrate in the step S3 to be 1:1-4:1.

In the present invention, the operating conditions (water content, voltage, temperature and time) of the first-stage microbial electrolytic cell coupled anaerobic digestion system in the step S2 and the second-stage microbial electrolytic cell coupled anaerobic digestion system in the step S3 are crucial. If the water content is too high, the system will have a low volume utilization rate, a high energy consumption, and a low efficiency; and if the water content is too low, the transfer of matters and current in the system will be inhibited. If the voltage is too low, it is difficult to realize the enhanced degradation of the organics and the enrichment of the functional microorganism; and if the voltage is too high, the anodic oxidation reaction will be severe, most of the organics will be directly oxidized, the microbial enrichment effect will be reduced, and the energy consumption will be high. When the microbial electrolytic cell coupled anaerobic digestion system in operation, if the temperature is too low, the reaction rate is slow, and if the temperature is too high, the energy consumption is high and it is not conducive to the growth and enrichment of the microorganism related to anaerobic digestion. When the microbial electrolytic cell coupled anaerobic digestion system is in operation, if the time is too short, the microbial community in the system will not be fully acclimated and enriched, and if the time is too long, the energy utilization efficiency is low, the organic matter consumption in the system is too high, and the microorganism might enter the decline phase, resulting in a reduced activity. In addition, the main purpose of the step S2 is to enrich microorganisms, and the resulting microbial mixture has the highest activity when the substrate is not completely consumed and the microbial reaction is the fastest; whereas, since the main purpose of the step S3 is to degrade degradation-resistant proteins, the substrate should be completely consumed as much as possible, therefore, the operation time of the system in the step S3 is longer than that in the step S2. The present invention controls the water content to be 95-98%, the applied external voltage at two ends to be 0.2-1.0 V, the operating temperature to be 20-37° C. and the operating time to be 2-4 d in the first-stage microbial electrolytic cell coupled anaerobic digestion system in the step S2. The present invention controls the water content to be 95-98%, the applied external voltage at two ends to be 0.2-1.0 V, the operating temperature to be 20-37° C. and the operating time to be 4-8 d in the second-stage microbial electrolytic cell coupled anaerobic digestion system in the step S3.

In the present invention, in the step S3, the proteins in the anaerobic digestion product of the excess sludge can be further degraded by 40-60%, the proportion by mass of proteins to total volatile solids in the excess sludge is reduced to 20-35%, and the total protein degradation rate of the excess sludge reaches 70-80%, namely, the proteins in the excess sludge are deeply degraded.

In the present invention, in the step S3, the organics in the anaerobic digestion product of the excess sludge can be further degraded by 20-30%, the final proportion by mass of volatile solids to total solids (VS/TS) in the excess sludge is reduced to 25-35%, and the degradation rate of total volatile solids of the excess sludge reaches 50-70%. Compared with traditional anaerobic digestion, the total methane production of the excess sludge can be increased by 50-55%, realizing the reduction, stabilization and recycling of excess sludge.

The innovation points of the present invention mainly lie in:

(1) The conventional microbial electrolytic cell coupled anaerobic digestion system acclimates functional microorganisms by taking excess sludge mixture as an inoculum or a substrate, and although it has a certain effect on degradation of organics, the presence of a large amount of degradable organics makes the microorganisms in the system grow rapidly and have high diversity, and the microbial population with specific functions is difficult to select and enrich. According to the present invention, with the anaerobic digestion product of excess sludge as the substrate, on the basis of primary selective removal of a large amount of degradable organics in the excess sludge, the residual degradable organics in the anaerobic digestion product of the excess sludge are subjected to secondary selective removal using a neutral detergent of Van Soest's washing method to effectively obtain sludge free of easily degradable organics and containing degradation-resistant proteins. This overcomes the negative influence of the degradable organics in the excess sludge on the efficiency of selective removal and on the selection and enrichment of the specific functional microorganism population in the subsequent system, so that the microorganism related to targeted degradation of degradation-resistant proteins is efficiently induced, acclimated and enriched in the microbial electrolytic cell coupled anaerobic digestion system, thereby realizing deep degradation of the degradation-resistant proteins.

(2) Most existing microbial electrolytic cell coupled anaerobic digestion systems adopt a single system. In such a system, a time difference exists between the rapid growth period of the microorganism and the efficient and complete degradation time of the substrate. For example, in the later stage of substrate degradation, the functional microorganism in the system has reduced activity and quantity due to the lack of substrate. Therefore, the single system is difficult to synchronously realize the efficient selection and enrichment of specific functional microorganisms and enzymes and the efficient degradation of substrates. In the present invention, a two-stage microbial electrolytic cell coupled anaerobic digestion system is designed in series, which enables the selection and enrichment of the microorganism related to target degradation and makes the degradation of substrates be distributed into the two microbial electrolytic cell coupled anaerobic digestion systems respectively, so that optimal functions can be achieved by adjusting corresponding parameters (such as inoculum, inoculation ratio, operating conditions) in the respective systems, thereby achieving efficient deep degradation of proteins in digested sludge on the basis of realizing efficient selection and enrichment of the targeted functional microorganism.

Compare with the prior art, the present invention has the following advantage:

(1) The protein degradation rate in the traditional anaerobic digestion of sludge is generally less than 50%, and even after enhancement by various pretreatment measures, the protein degradation rate in the anaerobic digestion of the sludge is still less than 60%, the total volatile solid degradation rate of the sludge is generally 40% or less, the proportion by mass of residual volatile solids to total solids (VS/TS) in the digestion product is as high as 30-40%, wherein the protein accounts for 40-50% by mass of the volatile solids. It is difficult for the prior art to deeply degrade the residual proteins. In the present invention, with the two stages of microbial electrolytic cell coupled anaerobic digestion systems in series, through treatment, design and conditioning of the inoculum and the substrate, the proteins in the digestion product of the excess sludge are further degraded by 40-60%, the organics are further degraded by 20-30%, the proportion by mass of final volatile solids to total solid mass (VS/TS) in the excess sludge is reduced to 25-35%, and the degradation rate of total volatile solids in the excess sludge reaches 50-70%. Compared with the traditional anaerobic digestion, the total methane production of the excess sludge can be increased by 50-55%, indicating that the present invention remarkably enhances deep degradation of proteins in the sludge and methane production, realizing the reduction, stabilization and recycling of the sludge.

(2) In the present invention, the proportion by mass of proteins to total volatile solids in the digestion product of excess sludge is finally reduced to 20-35%, which is remarkably lower than that (40-50%) in the digestion product of excess sludge under the conditions of the prior art. The significant reduction of the content of proteins (typical hydrophilic substance) in the sludge can improve the dehydration and drying performance of the sludge and reduce reagent and energy consumption required for dehydration and drying.

BRIEF DESCRIPTION OF THE DRAWINGS

FIG. 1 is a process flow block diagram of the present invention.

DESCRIPTION OF THE EMBODIMENTS

The present invention is described in detail below with reference to specific examples.

The following examples will help those skilled in the art to further understand the present invention, but are not intended to limit the present invention in any way. It should be noted that numerous variations and modifications may be made by those skilled in the art without departing from the spirit of the present invention. These variations and modifications are still within the scope of the present invention.

Example 1

A method for enhancing deep degradation of proteins in sludge by using a microbial electrolytic cell coupled anaerobic digestion system, as shown in FIG. 1, including the following steps:

(1) Preparation of neutral detergent of Van Soest's washing method: 18.6 g of sodium ethylenediamine tetraacetate (EDTA, analytical grade) and 6.8 g of sodium borate ($Na_2B_4O_7 \cdot 10H_2O$) were weighed and put into a beaker, and a small amount of distilled water was added thereto; after heating for dissolution, 30 g of sodium lauryl sulfate ($C_{12}H_{25}NaO_4S$) and 10 ml of 2-ethoxyethanol ($C_4H_{10}O_2$, analytical grade) were added; then, 4.56 g of anhydrous disodium hydrogen phosphate ($Na_2HPO_4$) was accurately weighed and placed into a separate beaker, a small amount of distilled water was added thereto, the mixture was slightly heated to dissolve, transferred to the previous beaker, and made up to 1000 ml;

(2) Excess sludge from the sewage plant was used, wherein the proportion by mass of volatile solids to total solids (VS/TS) was 41.2% and the protein content was 52.3% by mass of total volatile solids; after anaerobic digestion, an anaerobic digestion product was obtained; in the digestion product, the proportion by mass of volatile solids to total solids (VS/TS) was 30.5%, and the protein content was 46.7% by mass of total volatile solids;

(3) 10 g of the digestion product was taken, 100 ml of the neutral detergent, 0.5 g of decalin and 0.5 g of $NaSO_3$ were added thereto, and the resultant mixture was heated to boil and held for 60 min; the supernatant was removed to obtain a residue which was then washed with distilled water to pH=7 to obtain sludge free of easily degradable organics and containing degradation-resistant proteins, wherein the proportion by mass of volatile solids to total solids (VS/TS) was 22.5%, and the protein content was 25.8% by mass of total volatile solids;

(4) With the anaerobic digestion product of the excess sludge in the step (2) as an inoculum, and the sludge free of easily degradable organics and containing degradation-resistant proteins from the step (3) as a substrate, wherein the mass ratio of volatile solids between the inoculum and the substrate was 1:2, a first-stage microbial electrolytic cell coupled anaerobic digestion system (carbon-carbon/iron-carbon electrode) was started by applying an external voltage using a direct current power supply; when the water content in the system was 98%, the applied external voltage at two ends was 0.2 V, the operating temperature was 20° C. and the operating time was 4 d, the degradation rate of degradation-resistant proteins was 40%; the microbial mixture on the electrode surface and in the sludge solution was taken and centrifuged at 800 rpm for 10 min, and the supernatant was removed, thereby obtaining a microbial mixture related to targeted degradation of the degradation-resistant proteins, with the water content of 95.5% and the proportion by mass of volatile solids to total solids (VS/TS) of 31.0%;

(5) With the microbial mixture related to targeted degradation of the degradation-resistant proteins in the step (4) as an inoculum, and the anaerobic digestion product of the excess sludge as a substrate, wherein the mass ratio of volatile solids between the inoculum and the substrate was 1:1, a second-stage microbial electrolytic cell coupled anaerobic digestion system (carbon-carbon/iron-carbon electrode) was started by applying an external voltage using a direct current power supply; when the water content in the system was 98%, the applied external voltage at two ends was 0.2 V, the operating temperature was 20° C., and the operation time was 8 d, the proportion of proteins to total volatile solids in the discharged sludge can be reduced to 31.3%, the total protein degradation rate of the excess sludge was 70.5%, the proportion by mass of volatile solids to total solids (VS/TS) can be reduced to 25.6%, and the degradation rate of total volatile solids in the excess sludge was 50.9%.

Example 2

A method for enhancing deep degradation of proteins in sludge by using a microbial electrolytic cell coupled anaerobic digestion system, as shown in FIG. 1, including the following steps:

(1) Preparation of neutral detergent of Van Soest's washing method: 18.6 g of sodium ethylenediamine tetraacetate (EDTA, analytical grade) and 6.8 g of sodium borate ($Na_2B_4O_7 \cdot 10H_2O$) were weighed and put into a beaker, and a small amount of distilled water was added thereto; after heating for dissolution, 30 g of sodium lauryl sulfate ($C_{12}H_{25}NaO_4S$) and 10 ml of 2-ethoxyethanol ($C_4H_{10}O_2$, analytical grade) were added; then, 4.56 g of anhydrous disodium hydrogen phosphate ($Na_2HPO_4$) was accurately weighed and placed into a separate beaker, a small amount of distilled water was added thereto, the mixture was slightly heated to dissolve, transferred to the previous beaker, and made up to 1000 ml;

(2) Excess sludge from the sewage plant was used, wherein the proportion by mass of volatile solids to total solids (VS/TS) was 59.8% and the protein content was 57.6% by mass of total volatile solids; after pretreatment at 169° C. for 30 min followed by mesophilic anaerobic digestion, an anaerobic digestion product was obtained; in the digestion product, the proportion by mass of volatile solids to total solids (VS/TS) was 39.5%, and the protein content was 48.5% by mass of total volatile solids;

(3) 10 g of the digestion product was taken, 100 ml of the neutral detergent, 0.5 g of decalin and 0.5 g of $NaSO_3$ were added thereto, and the resultant mixture was heated to boil and held for 60 min; the supernatant was removed to obtain a residue which was then washed with distilled water to pH=7 to obtain sludge free of easily degradable organics and containing degradation-resistant proteins, wherein the proportion by mass of volatile solids to total solids (VS/TS) was 30.5%, and the protein content was 39.8% by mass of total volatile solids;

(4) With the anaerobic digestion product of the excess sludge in the step (2) as an inoculum, and the sludge free of easily degradable organics and containing degradation-resistant proteins from the step (3) as a substrate, wherein the mass ratio of volatile solids between the inoculum and the substrate was 1:5, a first-stage microbial electrolytic cell coupled anaerobic digestion system (carbon-carbon/iron-carbon electrode) was started by applying an external voltage using a direct current power supply; when the water content in the system was 95%, the applied external voltage at two ends was 1.0 V, the operating temperature was 30° C. and the operating time was 2 d, the degradation rate of degradation-resistant proteins was 42%; the microbial mixture on the electrode surface and in the sludge solution was taken and centrifuged at 1500 rpm for 5 min, and the supernatant was removed, thereby obtaining a microbial mixture related to targeted degradation of the degradation-resistant proteins, with the water content of 90.5% and the proportion by mass of volatile solids to total solids (VS/TS) of 41.6%;

(5) With the microbial mixture related to targeted degradation of the degradation-resistant proteins in the step (4) as an inoculum, and the anaerobic digestion product of the excess sludge as a substrate, wherein the mass ratio of volatile solids between the inoculum and the substrate was 4:1, a second-stage microbial electrolytic cell coupled anaerobic digestion system (carbon-carbon/iron-carbon electrode) was started by applying an external voltage using a direct current power supply; when the water content in the system was 95%, the applied external voltage at two ends was 1.0 V, the operating temperature was 30° C., and the operation time was 4 d, the proportion by mass of proteins to total volatile solids in the discharged sludge could be reduced to 34.3%, the total protein degradation rate of the excess sludge was 79.5%, the proportion by mass of volatile solids to total solids (VS/TS) could be reduced to 33.8%, and the degradation rate of total volatile solids in the excess sludge was 65.7%.

Example 3

A method for enhancing deep degradation of proteins in sludge by using a microbial electrolytic cell coupled anaerobic digestion system, as shown in FIG. 1, including the following steps:

(1) Preparation of neutral detergent of Van Soest's washing method: 18.6 g of sodium ethylenediamine tetraacetate (EDTA, analytical grade) and 6.8 g of sodium borate ($Na_2B_4O_7 \cdot 10H_2O$) were weighed and put into a beaker, and a small amount of distilled water was added thereto; after heating for dissolution, 30 g of sodium lauryl sulfate ($C_{12}H_{25}NaO_4S$) and 10 ml of 2-ethoxyethanol ($C_4H_{10}O_2$, analytical grade) were added; then, 4.56 g of anhydrous disodium hydrogen phosphate ($Na_2HPO_4$) was accurately weighed and placed into a separate beaker, a small amount of distilled water was added thereto, the mixture was slightly heated to dissolve, transferred to the previous beaker, and made up to 1000 ml;

(2) Excess sludge from the sewage plant was used, wherein the proportion by mass of volatile solids to total solids (VS/TS) was 52.5% and the protein content was 55.0% by mass of total volatile solids; after treatment under the condition of pH=10 for 6 h, the excess sludge was adjusted to a neutral pH value followed by mesophilic anaerobic digestion to obtain an anaerobic digestion product, wherein the proportion by mass of volatile solids to total solids (VS/TS) was 35.7%, and the protein content was 44.6% by mass of total volatile solids;

(3) 10 g of the digestion product was taken, 100 ml of the neutral detergent, 0.5 g of decalin and 0.5 g of $NaSO_3$ were added thereto, and the resultant mixture was heated to boil and held for 60 min; the supernatant was removed to obtain a residue which was then washed with distilled water to pH=7 to obtain sludge free of easily degradable organics and containing degradation-resistant proteins, wherein the proportion by mass of volatile solids to total solids (VS/TS) was 25.5%, and the protein content was 30.7% by mass of total volatile solids;

(4) With the anaerobic digestion product of the excess sludge in the step (2) as an inoculum, and the sludge free of easily degradable organics and containing degradation-resistant proteins from the step (3) as a substrate, wherein the mass ratio of volatile solids between the inoculum and the substrate was 1:4, a first-stage microbial electrolytic cell coupled anaerobic digestion system (carbon-carbon/iron-carbon electrode) was started by applying an external voltage using a direct current power supply; when the water content in the system was 97%, the applied external voltage at two ends was 0.6 V, the operating temperature was 25° C. and the operating time was 3 d, the degradation rate of degradation-resistant proteins was 41.8%; the microbial mixture on the electrode surface and in the sludge solution was taken and centrifuged at 1000 rpm for 10 min, and the supernatant was removed, thereby obtaining a microbial mixture related to targeted degradation of the degradation-resistant proteins, with the water content of 94% and the proportion by mass of volatile solids to total solids (VS/TS) of 37.8%;

(5) With the microbial mixture related to targeted degradation of the degradation-resistant proteins in the step (4) as an inoculum, and the anaerobic digestion product of the excess sludge as a substrate, wherein the mass ratio of volatile solids between the inoculum and the substrate was 2:1, a second-stage microbial electrolytic cell coupled anaerobic digestion system (carbon-carbon/iron-carbon electrode) was started by applying an external voltage using a direct current power supply; when the water content in the system was 96%, the applied external voltage at two ends was 0.6 V, the operating temperature was 25° C., and the operation time was 6 d, the proportion by mass of proteins to total volatile solids in the discharged sludge can be reduced to 34.3%, the total protein degradation rate of the excess sludge was 79.5%, the proportion by mass of volatile solids to total solids (VS/TS) could be reduced to 29.4%, and the degradation rate of total volatile solids in the excess sludge was 62.4%.

Comparative Example 1

A method for enhancing deep degradation of proteins in sludge by using a microbial electrolytic cell coupled anaerobic digestion system, including the following steps:

(1) Preparation of neutral detergent of Van Soest's washing method: 18.6 g of sodium ethylenediamine tetraacetate (EDTA, analytical grade) and 6.8 g of sodium borate ($Na_2B_4O_7.10H_2O$) were weighed and put into a beaker, and a small amount of distilled water was added thereto; after heating for dissolution, 30 g of sodium lauryl sulfate ($C_{12}H_{25}NaO_4S$) and 10 ml of 2-ethoxyethanol ($C_4H_{10}O_2$, analytical grade) were added; then, 4.56 g of anhydrous disodium hydrogen phosphate ($Na_2HPO_4$) was accurately weighed and placed into a separate beaker, a small amount of distilled water was added thereto, the mixture was slightly heated to dissolve, transferred to the previous beaker, and made up to 1000 ml;

(2) Excess sludge from the sewage plant was used, wherein the proportion by mass of volatile solids to total solids (VS/TS) was 55.0% and the protein content was 55.8% of total volatile solids; after mesophilic anaerobic digestion, an anaerobic digestion product was obtained; in the digestion product, the proportion by mass of volatile solids to total solids (VS/TS) was 38.9%, and the protein content was 45.8% of total volatile solids;

(3) 10 g of the digestion product was taken, 100 ml of the neutral detergent, 0.5 g of decalin and 0.5 g of $NaSO_3$ were added thereto, and the resultant mixture was heated to boil and held for 60 min; the supernatant was removed to obtain a residue which was then washed with distilled water to pH=7 to obtain sludge free of easily degradable organics and containing degradation-resistant proteins, wherein the proportion by mass of volatile solids to total solids (VS/TS) was 29.5%, and the protein content was 38.7% by mass of total volatile solids;

(4) With the anaerobic digestion product of the excess sludge in the step (2) as an inoculum, and the sludge free of easily degradable organics and containing degradation-resistant proteins from the step (3) as a substrate, wherein the mass ratio of volatile solids between the inoculum and the substrate was 1:6, a first-stage microbial electrolytic cell coupled anaerobic digestion system (carbon-carbon/iron-carbon electrode) was started by applying an external voltage using a direct current power supply; when the water content in the system was 92%, the applied external voltage at two ends was 1.2 V, the operating temperature was 30° C. and the operating time was 5 d, the degradation rate of degradation-resistant proteins was 20.5%; the microbial mixture on the electrode surface and in the sludge solution was taken and centrifuged at 1500 rpm for 10 min, and the supernatant was removed, thereby obtaining a microbial mixture related to targeted degradation of the degradation-resistant proteins, with the water content of 95.5% and the proportion by mass of volatile solids to total solids (VS/TS) of 35.2%;

(5) With the microbial mixture related to targeted degradation of the degradation-resistant proteins in the step (3) as an inoculum, and the excess sludge as a substrate, wherein the mass ratio of volatile solids between the inoculum and the substrate was 5:1, a second-stage microbial electrolytic cell coupled anaerobic digestion system (carbon-carbon/iron-carbon electrode) was started by applying an external voltage using a direct current power supply; when the water content in the system was 92%, the applied external voltage at two ends was 1.2 V, the operating temperature was 30° C., and the operation time was 8 d, the proportion by mass of proteins to total volatile solids in the discharged sludge was 52.2%, the total protein degradation rate of the excess sludge was 48.2%, the proportion by mass of volatile solids to total solids (VS/TS) was 40.4%, and the degradation rate of total volatile solids in the excess sludge was 44.6%.

Comparative Example 2

A method for enhancing deep degradation of proteins in sludge by using a microbial electrolytic cell coupled anaerobic digestion system, including the following steps:

(1) Preparation of neutral detergent of Van Soest's washing method: 18.6 g of sodium ethylenediamine tetraacetate (EDTA, analytical grade) and 6.8 g of sodium borate ($Na_2B_4O_7 \cdot 10H_2O$) were weighed and put into a beaker, and a small amount of distilled water was added thereto; after heating for dissolution, 30 g of sodium lauryl sulfate ($C_{12}H_{25}NaO_4S$) and 10 ml of 2-ethoxyethanol ($C_4H_{10}O_2$, analytical grade) were added; then, 4.56 g of anhydrous disodium hydrogen phosphate ($Na_2HPO_4$) was accurately weighed and placed into a separate beaker, a small amount of distilled water was added thereto, the mixture was slightly heated to dissolve, transferred to the previous beaker, and made up to 1000 ml;

(2) The excess sludge from the sewage plant with the proportion by mass of volatile solids to total volatile solids (VS/TS) of 52.5% and the protein content of 54.2% by mass of total volatile solids was directly sent to the secondary selective removal without receiving the primary selective removal by anaerobic digestion;

(3) 10 g of the excess sludge was taken, 100 ml of the neutral detergent, 0.5 g of decalin and 0.5 g of $NaSO_3$ were added thereto, and the resultant mixture was heated to boil and held for 60 min; the supernatant was removed to obtain a residue which was then washed with distilled water to pH=7 to obtain sludge free of easily degradable organics and containing degradation-resistant proteins, wherein the proportion by mass of volatile solids to total solids (VS/TS) was 48.5%, and the protein content was 50.6% by mass of total volatile solids;

(4) With the excess sludge in the step (2) as an inoculum, and the sludge free of easily degradable organics and containing degradation-resistant proteins from the step (3) as a substrate, wherein the mass ratio of volatile solids between the inoculum and the substrate was 1:5, a first-stage microbial electrolytic cell coupled anaerobic digestion system (carbon-carbon/iron-carbon electrode) was started by applying an external voltage using a direct current power supply; when the water content in the system was 98%, the applied external voltage at two ends was 1.0 V, the operating temperature was 30° C. and the operating time was 4 d, the degradation rate of degradation-resistant proteins was 28%; the microbial mixture on the electrode surface and in the sludge solution was taken and centrifuged at 1500 rpm for 10 min, and the supernatant was removed, thereby obtaining a microbial mixture related to targeted degradation of the degradation-resistant proteins, with the water content of 95.2% and the proportion by mass of volatile solids to total solids (VS/TS) of 45.8%;

(5) With the microbial mixture related to targeted degradation of the degradation-resistant proteins in the step (4) as an inoculum, and the anaerobic digestion product of excess sludge as a substrate, wherein the mass ratio of volatile solids between the inoculum and the substrate was 2:1, a second-stage microbial electrolytic cell coupled anaerobic digestion system (carbon-carbon/iron-carbon electrode) was started by applying an external voltage using a direct current power supply; when the water content in the system was 98%, the applied external voltage at two ends was 1.0 V, the operating temperature was 30° C., and the operation time was 8 d, the proportion by mass of proteins to total volatile solids in the discharged sludge was 55.2%, the total protein degradation rate of the excess sludge was 41.2%, the proportion by mass of volatile solids to total solids (VS/TS) was 38.9%, and the degradation rate of total volatile solids in the excess sludge was 42.5%.

Comparing Comparative Examples 1 to 2 with the Examples, it can be found that it is very important to incorporate anaerobic digestion for primary selective removal in the process of the present invention, if the sludge is used without the primary selective removal, the efficiency of the secondary selective removal will be greatly reduced, the acclimation and selection of the subsequent target microorganism will be affected, and finally the degradation rate of proteins will be greatly reduced. In addition, the inoculation ratio and operating conditions in the first-stage microbial electrolytic cell coupled anaerobic digestion system and the second-stage microbial electrolytic cell coupled anaerobic digestion system are very important, and if these parameters are out of the optimal ranges as described in the present invention, the degradation rate of proteins will be greatly reduced.

The method of the present invention can make the degradation rate of total volatile solids in the excess sludge reach 50-70%, the total degradation rate of proteins in the excess sludge to be 70-80%, and the proportion by mass of proteins to total volatile solids in the digestion product of the excess sludge to be finally reduced to 20-35%, thereby remarkably enhancing the deep degradation of proteins and the methane production in the sludge, realizing the reduction, stabilization and recycling of the sludge, and remarkably reduce the content of proteins (typical hydrophilic substances) in the sludge, thereby improving the dehydration and drying performance of the sludge.

Specific embodiments of the present invention have been described above. It is to be understood that the present invention is not limited to the specific embodiments described above, and that those skilled in the art can make various changes or modifications within the scope of the claims without affecting the spirit of the present invention.

What is claimed is:

1. A method for enhancing degradation of proteins in sludge, comprising the following steps:
    (S1) using an anaerobic digestion product of excess sludge as a substrate, treating the substrate with a neutral detergent of Van Soest's washing method, removing a resultant supernatant to obtain a residue, and washing the residue with distilled water to be at a neutral pH value to obtain a sludge free of easily degradable organics, wherein the sludge contains degradation-resistant proteins;
    (S2) using the anaerobic digestion product of excess sludge as an inoculum, using the sludge free of easily degradable organics obtained in the step (S1) as a substrate, starting a first-stage microbial electrolytic cell coupled anaerobic digestion system by applying an external voltage through a direct current power supply to acclimate and enrich a target microorganism, taking a microbial mixture on a surface of electrodes and in a sludge solution to concentrate by centrifuging to obtain a microbial mixture related to targeted degradation of the degradation-resistant proteins; and
    (S3) using the microbial mixture obtained in the step (S2) as an inoculum, using the anaerobic digestion product of excess sludge as a substrate, starting a second-stage microbial electrolytic cell coupled anaerobic digestion system by applying an external voltage through a direct current power supply to degrade proteins in the anaerobic digestion product of the excess sludge.

2. The method for enhancing degradation of proteins in sludge according to claim 1, wherein in the excess sludge, a proportion by mass of volatile solids to total solids is 40-60%, and the proteins account for 50-60% by mass of total volatile solids; in the anaerobic digestion product of the excess sludge, the proportion by mass of volatile solids to total solids is 30-40%, and the proteins account for 40-50% by mass of total volatile solids; in the sludge free of easily degradable organics in the step (S1), a proportion by mass of volatile solids to total solids is 20-30%, and the proteins account for 20-40% by mass of total volatile solids.

3. The method for enhancing degradation of proteins in sludge according to claim 1, wherein in the step (S2), a mass ratio of volatile solids between the inoculum and the substrate is 1:2-1:5.

4. The method for enhancing degradation of proteins in sludge according to claim 1, wherein in the step (S2), the first-stage microbial electrolytic cell coupled anaerobic digestion system is in an anaerobic state, a water content in the first-stage microbial electrolytic cell coupled anaerobic digestion system is 95-98%, an applied external voltage is 0.2-1.0 V, an operating temperature is 20-30° C., and operating time is 2-4 days.

5. The method for enhancing degradation of proteins in sludge according to claim 1, wherein in the step (S2), when a degradation rate of degradation-resistant proteins in the first-stage microbial electrolytic cell coupled anaerobic digestion system is 40% or more, the acclimation and enrichment of the target microorganism are completed.

6. The method for enhancing degradation of proteins in sludge according to claim 1, wherein in the step (S2), the concentration by centrifuging is performed under a condition of 800-1500 rpm for 5-10 min.

7. The method for enhancing degradation of proteins in sludge according to claim 1, wherein in the step (S2), a water content is 90-95% and a proportion by mass of volatile solids to total solids is 30-40% in the microbial mixture.

8. The method for enhancing degradation of proteins in sludge according to claim 1, wherein in the step (S3), a mass ratio of volatile solids between the inoculum and the substrate is 1:1-4:1.

9. The method for enhancing degradation of proteins in sludge according to claim 1, wherein in the step (S3), the second-stage microbial electrolytic cell coupled anaerobic digestion system is in an anaerobic state, a water content in the second-stage microbial electrolytic cell coupled anaerobic digestion system is 95-98%, an applied external voltage is 0.2-1.0 V, an operating temperature is 20-30° C., and operating time is 4-8 days.

10. The method for enhancing degradation of proteins in sludge according to claim 1, wherein in the step (S3), in the sludge discharged from the second-stage microbial electrolytic cell coupled anaerobic digestion system, proteins account for 20-35% by mass of total volatile solids, a degradation rate of proteins is 70-80%, a proportion by mass of volatile solids to total solids in the discharged sludge is 25-35%, and a degradation rate of total volatile solids is 50-70%.

* * * * *